US006411971B1

(12) United States Patent
Meier et al.

(10) Patent No.: US 6,411,971 B1
(45) Date of Patent: Jun. 25, 2002

(54) METHOD AND SYSTEM FOR DEVELOPING INTERACTIVE MULTIMEDIA APPLICATIONS FOR USE ON AN INTERACTIVE NETWORK

(75) Inventors: John R. Meier, Longmont; Donald Kasica, Boulder; John P. Lafer, Louisville; Michael D. Williams, Boulder, all of CO (US)

(73) Assignees: Media One Group, Englewood; US West, Inc., Denver, both of CO (US)

( * ) Notice: Subject to any disclaimer, the term of this patent is extended or adjusted under 35 U.S.C. 154(b) by 1292 days.

(21) Appl. No.: 08/659,430

(22) Filed: Jun. 6, 1996

Related U.S. Application Data

(63) Continuation of application No. 08/372,158, filed on Jan. 13, 1995, now abandoned.

(51) Int. Cl.[7] .............................................. G06F 17/21
(52) U.S. Cl. .................................................. 707/500.1
(58) Field of Search ................................ 395/806, 807, 395/762, 774; 345/302; 707/500.1

(56) References Cited

U.S. PATENT DOCUMENTS

| 5,287,199 A | * | 2/1994 | Zoccolillo .................... 358/402 |
| 5,344,132 A | * | 9/1994 | LeBrun et al. ................ 271/35 |
| 5,404,411 A | * | 4/1995 | Banton et al. ................ 382/54 |
| 5,455,910 A | * | 10/1995 | Johnson et al. ............. 395/153 |

OTHER PUBLICATIONS

De Rose et al., "Making Hypermedia Work: A User's Guide to HyTime", pp. 77–100, 253–274, 295–319, Jan. 1994.*
DeRose et al., Making Hypermedia Work: A User's Guide to HyTime, pp. 77–100, 295–319, Jan. 1994.*
Bulterman et al., "A Structure for Transportable, Dynamic Multimedia Documents", USENIX—Summer '91, pp. 137–155, Jun. 1991.*
Bryan, "Document Markup for Open Information Interchange", IEE Colloquium on 'Adding Value to Documents with Markup Languages', pp. Mar. 3/1–3/3 , Jun. 1994.*
Goldfarb, "HyTime: A Standard for structured hypermedia interchange", Computer, v. 24, n. 8, pp. 81–84, Aug. 1991.*
Markey, "HyTime and MHEG", COMPCON Spring 1992, pp. 25–40, Feb. 1992.*
Buford et al., "Integrating object–oriented scripting languages with HyTime", Proc. of Intl. Conf. on Multimedia Computing Systems, pp. 425–434, May 1994.*
Erfle, "HyTime as the Multimedia Document Model of Choice", Proc. of Intl. Conf. on Multimedia Computing Systems, pp. 445–454, May 1994.*
Thomas et al., "Diamond: A Multimedia Message System Built on a Distributed Architecture", *Computer* (Dec. 1985), pp. 65–78.*
Macromedia, Inc., *Authorware Professional Users Guide*, version 2.0 for Macintosh, pp. 164–171 (1992).*

* cited by examiner

Primary Examiner—Stephen S. Hong
(74) Attorney, Agent, or Firm—Brooks & Kushman, P.C.

(57) ABSTRACT

A method and system for developing a multimedia application for use on an interactive network. The system implements the method steps of receiving a set of signals representing a multimedia asset, defining an application composite describing an event, an action and a multimedia asset, and generating an ASCII source file based on the step of defining a composite.

1 Claim, 3 Drawing Sheets

METHOD AND SYSTEM FOR DEVELOPING INTERACTIVE MULTIMEDIA APPLICATIONS FOR USE ON AN INTERACTIVE NETWORK

CROSS-REFERENCE TO RELATED APPLICATIONS

This application is a continuation of U.S. patent application Ser. No. 08/372,158, filing date Jan. 13, 1995, now abandoned, which is related to U.S. patent application Ser. No.: 08/915,188, entitled "Method And System For Preloading Prefetch Data Of A Multimedia Application In An Interactive Network," which is a continuation of Ser. No. 08/372,152, now abandoned; Ser. No. 08/372,153, entitled "Method For Automatically Collecting Semantic Event Data In An Interactive Network," now U.S. Pat. No. 5,752,159; Ser. No. 08/372,157, entitled "Method And System For Managing Multimedia Assets For Proper Deployment On Interactive Networks," now U.S. Pat. No. 5,748,956; and Ser. No. 08/659,429, entitled "Method And System For Describing Functionality Of An Interactive Multimedia Application For Use On An Interactive Network," which is a continuation of Ser. No. 08/372,159, now abandoned. The related applications are commonly assigned to the assignee of the present application and are hereby incorporated by reference.

TECHNICAL FIELD

This invention relates generally to methods for developing multimedia applications and executing such applications on an interactive network.

BACKGROUND ART

Recently, interactive networks, including broadband television and computer networks, are being deployed at a rapid pace. This increase in the number of interactive networks has created a need for the rapid development of accompanying multimedia applications to be executed on such networks.

Traditionally, multimedia applications have included audio/video assets and have been developed using a low level language such as C or C++. Although authoring packages have provided the facility to develop portions of applications in higher level languages, the prior art still relies on custom programming to support the entire application.

As a consequence of their low level and customized nature, employing the prior art methods to develop multimedia applications is not only time consuming but also results in applications which are difficult to support. Further, the multimedia applications developed using the prior art methods are customized to operate on specific hardware.

DISCLOSURE OF THE INVENTION

In view of the prior art, a need exists for a method for more efficiently developing multimedia applications which may be executed at a client station.

It is an object of the present invention to provide a method for developing a multimedia application which results in reduced development time.

It is another object of the present invention to provide a method for developing a multimedia application which may be executed at a client station regardless of the hardware manufacturer.

In carrying out the above objects and other objects of the present invention, a method is provided for developing a multimedia application for use on an interactive network. The method begins with the step of receiving a set of signals representing a multimedia asset. The method next includes the step of assigning the asset to the multimedia application.

The method continues with the step of defining an application composite. The composite comprising an event, an action and the asset. The method concludes with the step of generating an ASCII source file of high-level commands based on the step of defining a composite. The multimedia application is described by the contents of the ASCII source file.

In further carrying out the above objects and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
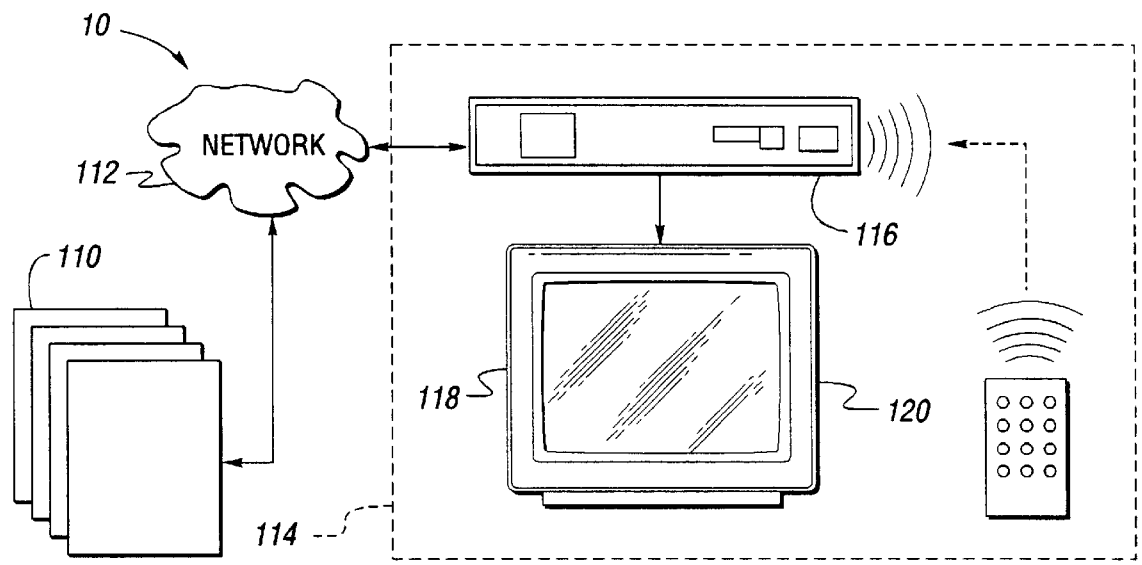
FIG. 1 is a schematic block diagram of the environment in which the present invention is used.

Referring now to the drawings, FIG. 1 is a schematic block diagram illustrating an interactive television ("ITV") system 10 for use with the present invention. System 10 includes at least one ITV server 110 for use with an ITV network 112. ITV server 110 is connected through ITV network 112 with client station 114.

There are a number of equipment manufacturers who produce commercially available equipment which could function as ITV server 110. In fact, the control logic employing the method of the present invention has been successfully implemented on DEC Alpha AXP processors running DEC OSF/1; SGI mips-based processors running IRIX; and SUN processors running SunOS.

The control logic has been implemented in both C and C++. If necessary, it could be easily ported to other UNIX platforms.

Client station 114 includes set top terminal 116, television 118 and remote controller 120. Preferably, set top terminal 116 would be either a Time-Warner full service network Home Communications Terminal ("HCT") or a 3DO set top terminal. The Time Warner HCT employs a MIPS R4000 chip running at 80–100 MHz and incorporates Silicon Graphics Indigo Workstation components.

The 3DO set top terminal employs a proprietary 3DO chip set. The control logic communicating with the 3DO set top terminals conform to the 3DO RPC Folio, as described in the "3DO Network Developer's Guide—Preliminary Draft", dated July, 1994.

Both terminals, Time Warner and 3DO, are capable of receiving digital full-motion video, animation, graphics and audio data. Both terminals are further capable of converting this digital information into an analog signal for transmission to television 118.

Client station 114 further includes an input device 120. Preferably input device 120 is an infrared remote control including a number of alpha-numeric keys. Alternatively, input device 120 could be an infrared mouse.

As those skilled in the art will recognize, system 10 is an interactive television network employing a client-server architecture. ITV server 110 provides mass storage and services to client station 114. Control logic resides at both server 110 and client station 114 to support the client-server architecture.

Although the preferred server 110 and client station 114 are part of an interactive television system, the present invention is not limited to such an embodiment. For example, client station 114 could be a kiosk or personal computer without adversely affecting the utility of the present invention.

Figure 2:
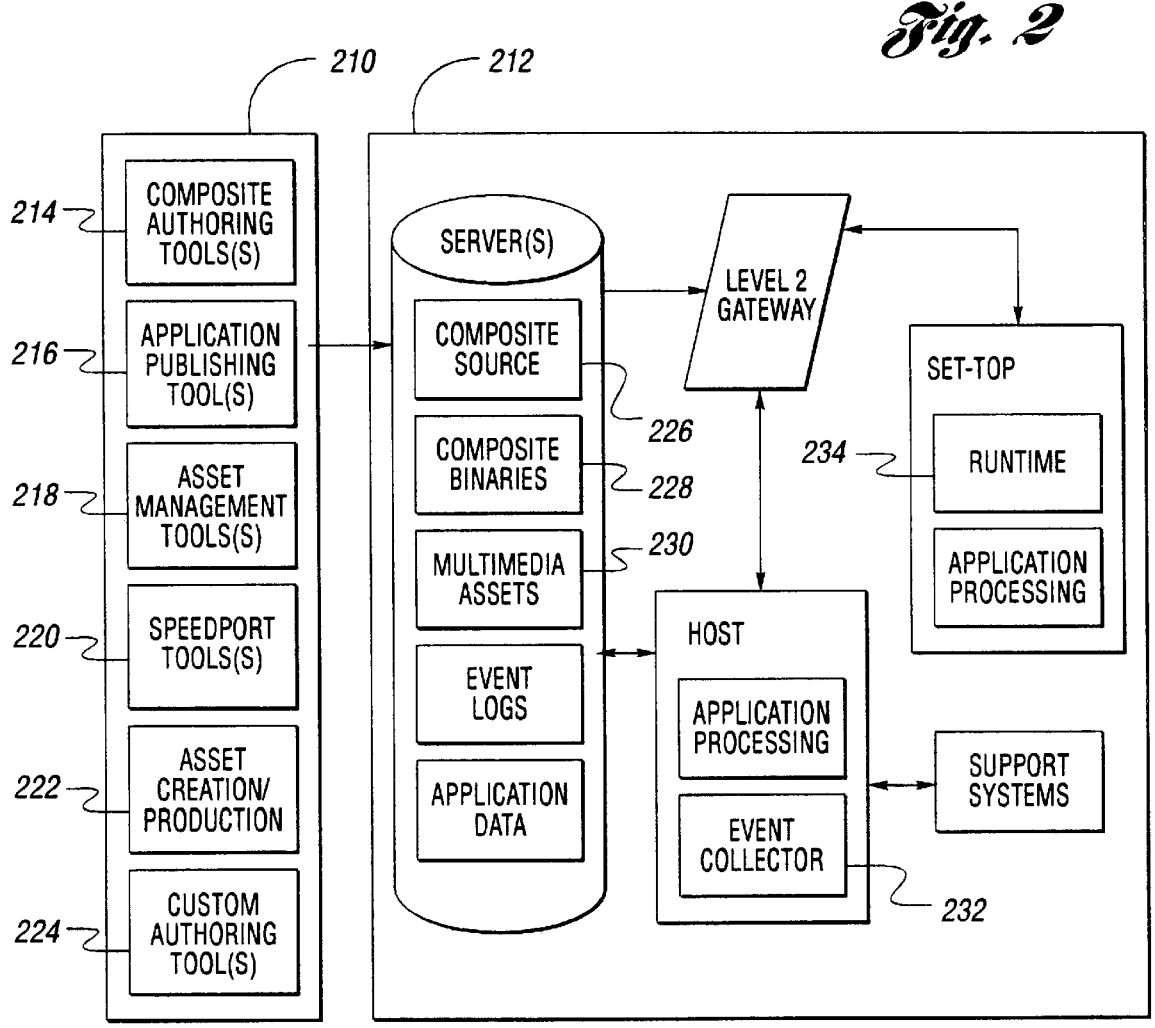
FIG. 2 is a schematic block diagram illustrating the preferred architecture of an interactive television network employing the development method of the present invention.

Referring now to FIG. 2, there is shown a schematic block diagram illustrating the architecture of the Information Services Infra-Structure ("ISIS") employing the application development method of the present invention. ISIS provides a set of interoperable software tools for developing and executing interactive multimedia applications for delivery on a variety of consumer electronic devices over a variety of broadband networks.

The ISIS architecture includes two categories of software components: development components 210 and runtime components 212. Development components 210 include authoring and application publishing tools for building a multimedia application.

The authoring tools work with existing asset creation and production tools such as Adobe Photoshop, Adobe Premier, and SoundEdit Pro which can be used to create videos, graphics, audio, and fonts. An authored application can be compiled and tested in either a standalone Macintosh configuration or a client/server environment over a network. The application publishing tools move the application from a standalone environment to a server environment and to the eventual deployment/production environment.

The ISIS runtime components 212 are responsible for executing an authored application. ISIS runtime components 212 provide the execution environment for the application in a client/server environment where the client device is a consumer set top terminal. In order to support emerging consumer set top terminals, as well as Macintoshes and PCs, the developed applications are portable.

The initial focus of ISIS was to deliver 3DO Runtime software for the U S WEST Broadband network trial in Omaha, Neb., in the fourth quarter of 1994. A Macintosh version of the runtime components is also supported to allow testing of applications without expensive 3DO or DEC development hardware and software.

Composite Authoring Tool (CAT)

Figure 3:
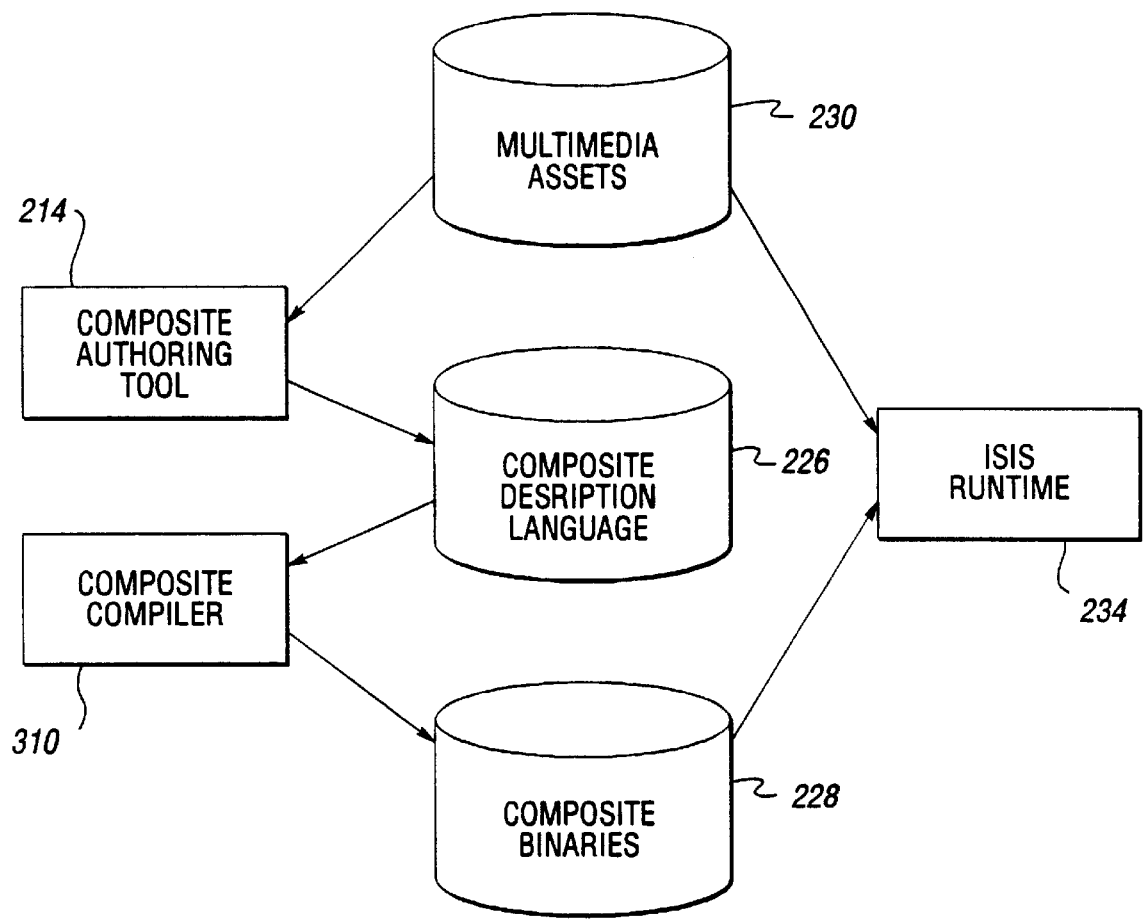
FIG. 3 is a schematic block diagram illustrating the relationship between various file formats and the runtime component of a set top terminal.

Referring now to FIG. 3, there is illustrated the relationship between CAT 214, composite compiler 310, various file formats and the ISIS runtime module component 234 of set top terminal 114. CAT 214 is an authoring tool that runs on the Macintosh and defines the compositing of multimedia assets (i.e. video, graphics, audio, and text) into interactive multimedia applications. CAT 214 provides an integrated graphical layout editor, a forms editor, and a testing environment.

With the layout editor, display objects can be easily defined and laid out in a window that represents a television screen. Each display object also has a detail forms window in which additional object attributes can be specified.

CAT 214 provides a seamless testing environment on the Macintosh which is integrated with a composite compiler and the Macintosh version of the runtime composite. CAT 214 invokes composite compiler 310 to compile the composite, and then invokes ISIS runtime module 234 to execute the composite. A new composite can be created and tested with a few clicks of the mouse.

CAT 214 delivers a source composite definition 226 and a binary composite definition 228 as output in Composite Description Language ("CDL"). CDL provides an event driven, object oriented syntax for defining a multimedia application.

CDL source files are stored in ASCII format, which makes it easy to read by any program that can read ASCII text files. CDL source files can be generated by CAT 214 and editted by custom built authoring tools or any editor capable of handling ASCII text files.

Composite compiler 310 converts CDL from a source format into a more compact binary format. ISIS runtime module 234 then reads and executes the instructions of the application in this binary format.

Composite compiler 310 includes a composite optimizer which condenses multiple composite files and assets referenced by the composite to a single composite binary file. Reducing the number of physical files within the application reduces the number of file accesses the ISIS runtime module 234 must perform to execute a composite. File accesses are expensive, especially in a network environment because of network latency.

Composites, composite items, events, actions, and templates are the building blocks of CDL and any application built in ISIS.

Composite

A composite is a collection of assets, events and actions assembled into a "scene" that the ISIS runtime module 234 plays back. Composites can also contain other composites. To describe interactivity, a composite defines how to handle external events such as button presses on a remote control.

Composite Item

A composite item is a multimedia object (i.e. video, graphic, text, audio, animation or custom library) within a composite. Attributes such as screen location, transparency and audio and video looping further define composite items.

Event

An event is an occurrence to which an application must react. Events can occur externally or internally to the ISIS runtime module 234. Button presses on a remote control are external events. The passage of time, entering a composite and starting a stream are internal events.

As ISIS runtime module 234 plays back a composite, it also monitors events as they occur. When an event occurs that is of interest to the executing composite, the ISIS runtime module 234 executes the actions associated with that event. An event always has at least one action associated with it.

Action

CDL has predefined actions that the ISIS runtime module 234 player can perform. For example, a common action for composite items is "enable." The enable action tells the ISIS runtime module 234 to display a graphic, play an audio file, etc.

Another common action is "transition to:composite" which tells the ISIS runtime module 234 to execute the composite defined by the "transition to" action. In effect, these transitions link composites together into an application. In addition to the predefined actions that ISIS provides, a developer can write and add custom actions.

Composite Templates

Composites can also be templates. Any composite can take its composition from another composite simply by referencing that composite as a template. Composites inherit (using a delegation mechanism) all items, events, and actions from a template.

Application Publishing

The ISIS application publishing tools 216 are utilities that move an application between a test environment and a deployment environment. These tools move all the objects of an ISIS application including composites, video, graphic and audio files, fonts, and custom code.

Application publishing tools 216 examine composite descriptions, determine all the files that support the composites, and move the application to a staging area such as tape or disk. From the staging area, the application can be moved to a variety of environments.

ISIS also supports incremental publishing. Using incremental publishing, only those objects that have been altered since the last publishing of the application are moved. This lets the developer add new features and change content quickly.

Asset Management and Production System (AMPS)

The ISIS Asset Management and Production System (AMPS) 218 provides a set of tools for managing multimedia assets 230 and ISIS applications. AMPS 218 provides multimedia title developers with an easy and convenient way to catalog assets, perform keyword searches on assets, archive assets and publish applications. AMPS 218 moves applications and assets from a development environment to a deployment environment.

Figure 4:
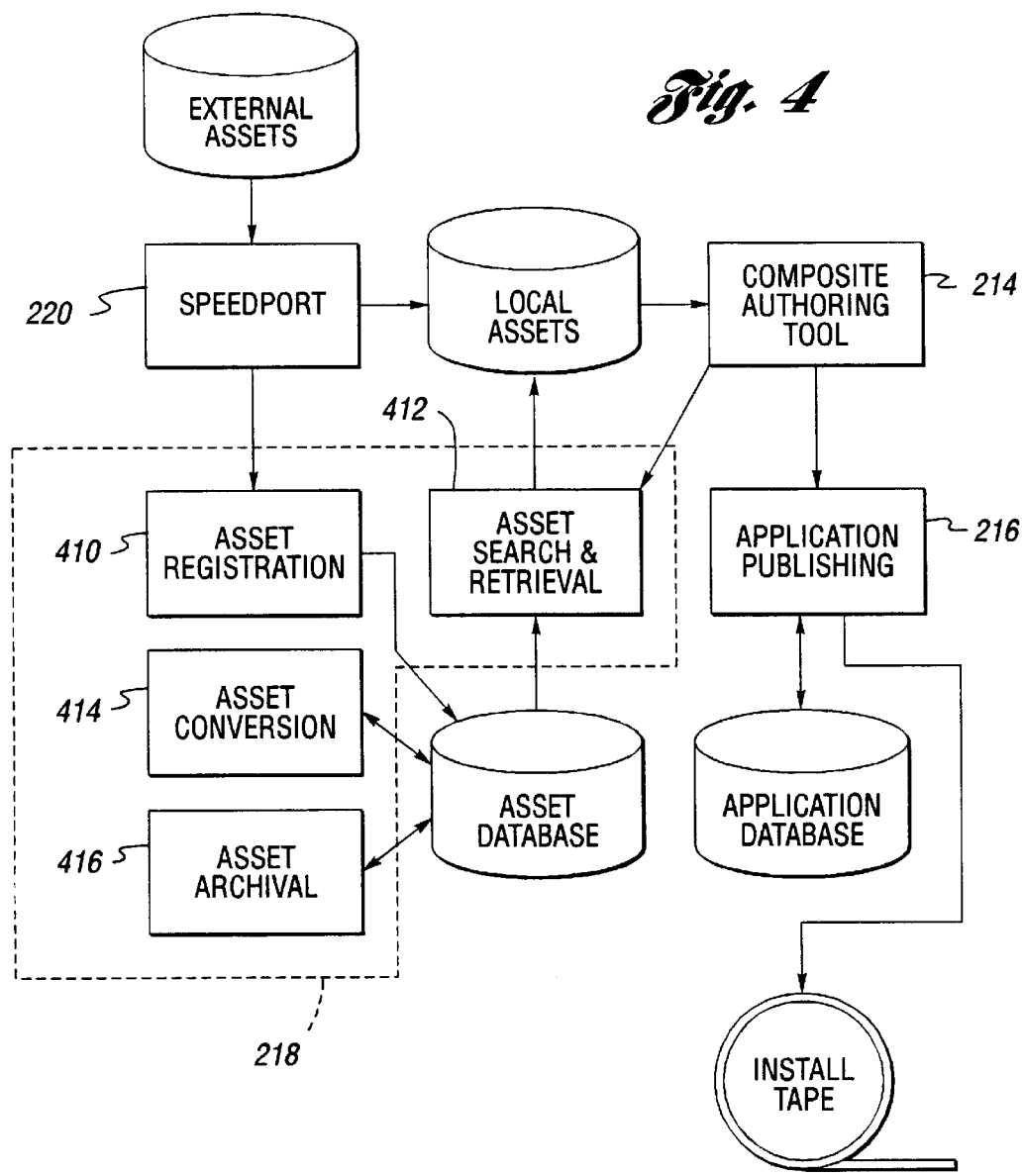
FIG. 4 is a functional block diagram illustrating the relationship between components of the Asset Management and Production System of the preferred embodiment.

Referring now to FIG. 4, there is a functional block diagram illustrating the relationship between components of AMPS 218 of the preferred embodiment.

Asset Registration

Asset registration 410 allows the developer to identify and catalog an asset or group of assets with AMPS 218. The developer can also assign keywords to the asset during the registration process. The developer can register assets manually using asset registration screens. Speedport 220 also uses the asset registration function to allow the developer to register assets in an automated fashion.

Asset Search and Retrieval

The asset search and retrieval function 412 allows the developer to perform keyword searches of the asset database. Asset retrieval supports the browsing of assets and/or using the asset within a multimedia application. CAT 214 integrates with the asset search and retrieval function 412, providing the developer an easy and convenient way to locate assets during the authoring process.

Asset Conversion

Multimedia assets come in many different formats. The ISIS asset conversion tools 414 convert assets from one format to another as specified to the conversion process. A wide variety of formats are supported, including virtually all of the more commonly used formats today.

In general, the runtime platform requires assets to be in a certain format. For example, 3DO supports a format unique to the 3DO environment, called a CEL. The asset conversion tools 414 convert assets from a wide variety of formats into 3DO cels.

Conversions can be run against a single asset or in batch against multiple assets. The converted asset is automatically registered with AMPS 218 as a new version.

Asset Archival

Asset archival 416 performs backup and recovery of assets. Asset archival 416 also moves assets off of faster magnetic disk devices to slower devices such as magnetic tape.

The archival of assets to slower devices provides significant cost benefits while still making the asset available to users of the system. Users are still able to perform keyword searches and view thumbnails on the archived asset. If the user wants to use the archived asset and it has been archived to a mounted device, AMPS 218 copies the asset back to disk. Otherwise, AMPS 218 notifies the user as to the location of the asset.

AMPS 218 also performs backup and recovery of assets to magnetic tape allowing the user to recover a previous version of an asset or restore an asset which may have been accidentally deleted.

Speedport Tools

Speedport 220 is a component of the ISIS tool set that transforms existing multimedia applications into ISIS applications. Speedport 220 provides tools to systematically extract multimedia assets from existing titles and to register those assets with AMPS 218. Speedport 220 also provides a methodology and practical guidance for converting the application into an ISIS application.

Speedport 220 speeds up the conversion of any existing multimedia application. Speedport 220 accepts a variety of digital media including CD-ROM, magnetic disk, optical drives, and digital tape.

Speedport 220 also defines a methodology or set of practices for porting application to the ISIS environment. This methodology guides the developer through the steps of moving application components from the existing environment into ISIS.

When performing asset extraction, speedport 220 first searches the existing application and identifies multimedia assets from the set of files input to speedport 220. This includes a variety of graphic, audio, and video file formats.

Next, speedport 220 Converts and renames the assets into a format usable by CAT 214 and the Macintosh runtime module. Speedport 220 then registers both the source and converted asset with AMPS 218. Finally, speedport 220 generates reports identifying assets extracted by type and a list of unknown types.

The ISIS development component 210 finally include an interface to standard facilities such as asset creation/ production 222 and custom authoring tools 224.

ISIS Runtime Components

A major component of the ISIS runtime component 212 is the ISIS runtime module 234 which resides at client station 114. ISIS runtime module 234 reads and plays back composite binary files 228 defined during the authoring process. It reads the startup composite, waits for events to occur, and then executes the actions associated with those events.

There are three major processing components of ISIS runtime module 234: the player; the preloader and the event collector.

As the heart of the runtime module 234, the player handles the display and playback of composite items, monitors and handles events as they occur, performs actions, and communicates with the preloader and event collector as needed.

The preloader provides the ISIS runtime module 234 with an overall memory management and caching scheme whose purpose is to improve performance and to hide latency. When an application starts and the player invokes the first composite, the preloader retrieves all of the files necessary to play the composite. It then looks at the composite and loads the "next" composites based on the transitions defined in the composite that is playing.

The event collector stores all internal and external events, as they occur, in a buffer in memory at client station 114. These events can be sent to the event collector 232 on the server for logging to a file or for additional processing.

The event collector captures the event information in enough detail so that ISIS runtime module 234 can use the event logs to play back an application session exactly as it appeared to the end user. ISIS runtime module 234 is both compact and portable. Currently the total size of ISIS runtime module 234 is approximately 200 KB.

Figure 5:
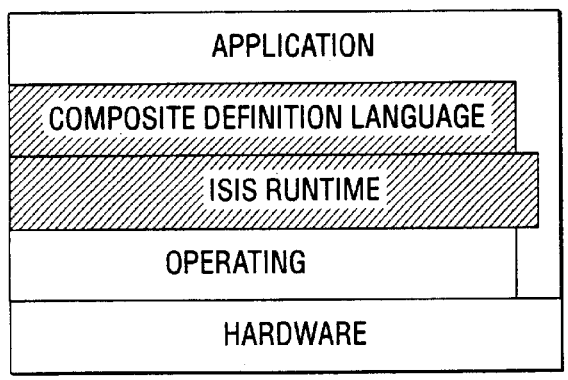
FIG. 5 is a block diagram illustrating the layered architecture employed by the preferred embodiment.

Applications developed using the ISIS development component 210 are easy to port to any client station equipped with ISIS runtime module 234. ISIS accomplishes this by providing the layered architecture shown in FIG. 5.

Applications written in CDL are hidden from the details of the hardware, operating system software, and ISIS runtime. Even if ISIS runtime runs on a client station with which the developer is unfamiliar, the CDL portion of the application runs without any changes.

There are other pieces of the application, however, that might require changes in order to execute on different client stations. The changes might include reformatting and re-encoding assets and converting fonts.

While the best mode for carrying out the invention has been described in detail, those familiar with the art to which this invention relates will recognize various alternative designs and embodiments for practicing the invention as defined by the following claims.

What is claimed is:

1. For use in a multimedia application development computer system, a method for developing a multimedia application for use on an interactive network employing a client-server architecture, the method comprising:

receiving signals via the computer system, the signals representing a plurality of multimedia assets including video, graphics, audio, and text;

defining a plurality of composites from the signals, each composite referencing other composites, describing an event, and including at least one internal event handler, each composite further describing an action associated with the event, and a sequence and a position of a plurality of multimedia assets, wherein the action comprises a transition between two of the plurality of composites, wherein at least one of the plurality of composites further includes a composite template;

generating an ASCII source file based on the composites defined, wherein the ASCII source file has an event driven, object oriented syntax;

transmitting the ASCII source file to an interactive network server;

storing the ASCII source file at the network server;

compiling the ASCII source file to condense the composites defined and the composites referenced by the composites defined;

generating at the network server a binary file based on the step of compiling: and storing at the network server the binary file.

\* \* \* \* \*